United States Patent

Ferguson

[15] 3,689,110
[45] Sept. 5, 1972

[54] FLUID LINE COUPLING

[72] Inventor: William B. Ferguson, 8405 Oso Street, Canoga Park, Calif. 91306

[22] Filed: Aug. 5, 1970

[21] Appl. No.: 61,180

[52] U.S. Cl. ................................. 285/15, 285/387
[51] Int. Cl. ............................................. F16l 55/18
[58] Field of Search .......... 285/15, 16, 373, 387, 356; 138/99

[56] References Cited

UNITED STATES PATENTS

| | | | |
|---|---|---|---|
| 625,448 | 5/1899 | Jaenichen | 285/373 X |
| 2,300,584 | 11/1942 | Martin | 285/356 |
| 631,867 | 8/1899 | Beaver | 285/356 X |
| 3,375,025 | 3/1968 | Engel | 285/15 |
| 3,428,337 | 2/1969 | Read | 285/387 X |
| 3,486,775 | 12/1969 | Callahan, Jr. et al. | 285/356 X |
| 3,517,701 | 6/1970 | Smith | 285/373 X |

FOREIGN PATENTS OR APPLICATIONS

| | | | |
|---|---|---|---|
| 427,650 | 6/1911 | France | 285/16 |

*Primary Examiner*—Andrew V. Kundrat
*Attorney*—William H. Maxwell

[57] ABSTRACT

A coupling adapted to be assembled over a tubular fluid conducting member, either to connect to a section thereof or to repair a leak therein, and comprised of a body providing a protective enclosure, a sleeve positioned to the body, and a plastic seal confined by the body and/or sleeve and forceably engaged thereby to flow directly into engagement with the said member. The body and sleeve are each an assembly of laterally interlocked longitudinally split segments adapted to be assembled and disassembled laterally over said member and seal. The seal is a longitudinally split ring of plastic material adapted to flow into encompassing embracement over said member. The sleeve has two forms, one an interlocked assembly and the other a laterally separable assembly, when in working positioning over the tubular fluid conducting member. A feature of the coupling is the capability of lateral assembly and disassembly, eliminating the passing of long lengths of tubular members through a coupling and/or eliminating the requirement of disassembly of tubular member installations in order to refit or to repair leakage therein.

21 Claims, 6 Drawing Figures

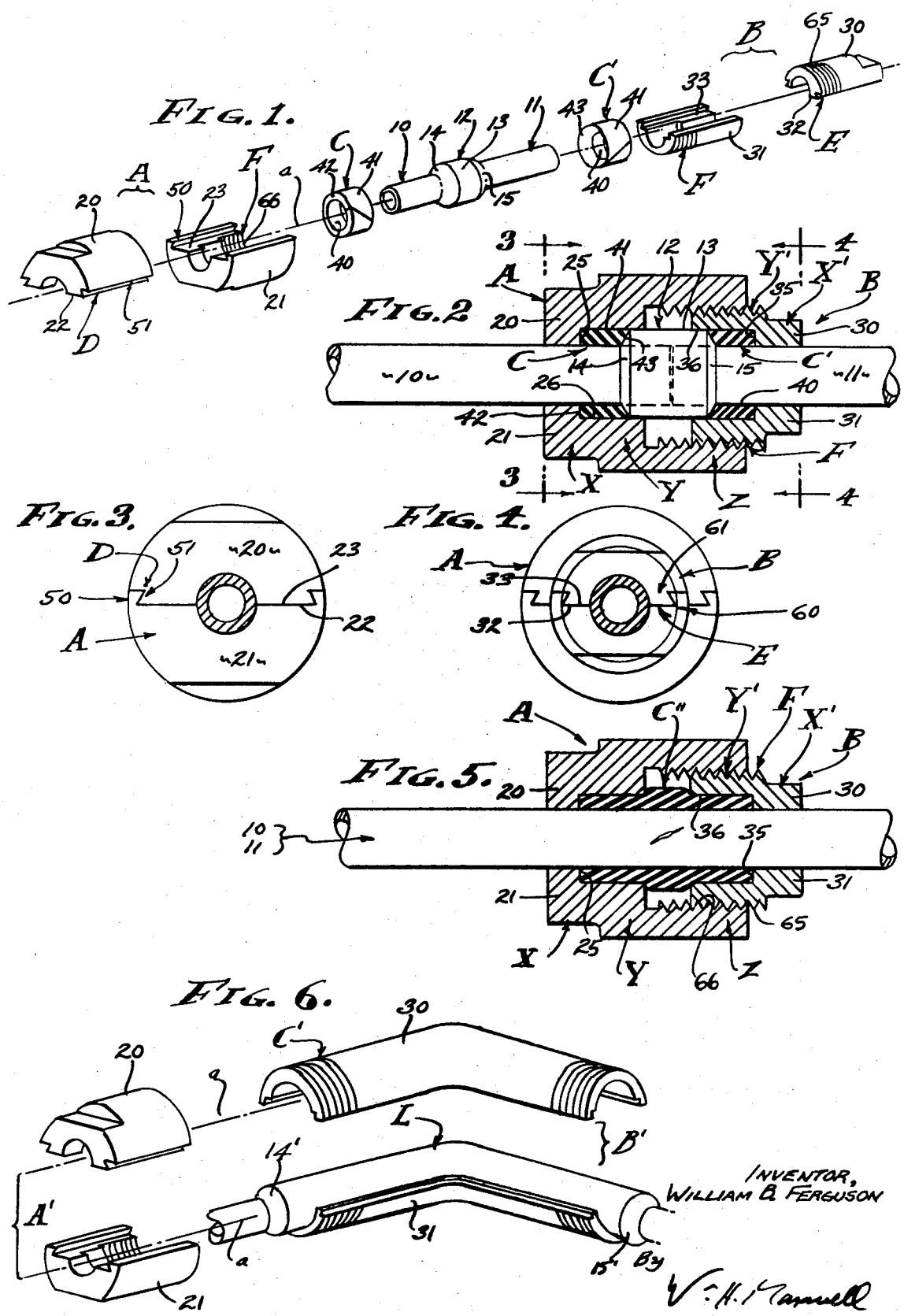

FLUID LINE COUPLING

The prior art relating to plumbing and pipe and tube fittings provides standarized and special fittings for various purposed, a most common conditional requirement being to simply connect a tubular member; and to this end nipples, unions and various types of couplings have been devised and are employed. Although the present invention is applicable to all tubular fluid conducting members and to equivalent conduits which house electrical conductors and the like, for example; tubing installations and the like are of particular concern, wherein a fluid conducting tubing section terminates at a union. Union structure can vary widely and a typical brazed union is shown herein, a primary coupling means that connects a tubing section, for example to connect one tubing section to another. Another typical union of tubing sections is the flared union and also various forms thereof which involve swaged tubing ends and/or equivalent fittings. Therefore, it is to be understood that the disclosure to follow herein is not restricted to any one type of primary tubing or pipe connection, nor is the disclosure reliant upon said primary connection, it being a general object of this invention to provide a leak-proof encasement that embraceably emcompasses a tubular member to seal hermetically therearound, or in like manner to couple like tubular members whether connected by other means or not.

An object of this invention is to provide an emcompassing embracement for tubular members in the form of an encasement capable of lateral assembly and disassembly therearound and providing an hermetic seal thereover. With the present invention, there is a body and/or a sleeve of releasibly interlocking segments, and a plastic seal that is captured therein and forced to flow into all interstices through positioning of said sleeve relative to said body.

Another object is to provide a body casement in a coupling of the type thus far referred to which is capable of withstanding substantial internal as well as external pressures, and utilitarian in relatively high pressure installations. With the present invention the body and/or sleeve is segmental, having circumferentially interlocked engagement of one segment to the other; said locked engagement being effected by means releasably connecting the marginal edges of one segment to the other.

It is another object of this invention to provide an encasement coupling of the type thus far referred to which is inseparably locked in working condition through the placement of a sleeve to a body and which forceably presses a seal into coextensive confinement with a chamber defined by said body or sleeve. With the present invention, the body and/or sleeve segments are interlocked so as to receive the seal, and said sleeve is then positioned to the body segments so as to longitudinal displacement. In practice, the interlocking feature is a dovetailed engagement of body and sleeve segments, and the keying feature is a threaded engagement of the assembled body and sleeve, thereby establishing a unit coupling wherein the seal is confined to flow into pressured engagement within all irregularities and interstices.

It is still another object of this invention to provide a coupling of the type referred to that is adapted to use in single or plural form, and that is adaptable to use in tees, elbows and in unique and specially shaped fittings. With the present invention, bulkhead fittings, hose fittings and conduit encasement are feasible; the invention residing in the laterally separable assembly characterized by positive circumferential interlocking and positive longitudinal keying, and a split gland of plastic material that is hermetically pressed into all irregularities and interstices.

The various objects and features of this invention will be fully understood from the following detailed description of the typical preferred form and application thereof, throughout which description reference is made to the accompanying drawings, in which:

FIG. 1 is an exploded perspective view showing a typical embodiment of the present invention.

FIG. 2 is an enlarged longitudinal sectional view illustrating the assembly of parts shown in FIG. 1.

FIGS. 3 and 4 are transverse sectional views taken as indicated by lines 3—3 and 4—4 on FIG. 2.

FIG. 5 is a sectional view similar to FIG. 2 showing a modified form of the invention.

FIG. 6 is a perspective view showing the modified adaption of the coupling to other than straight fittings.

Referring now to the drawings, the fluid line coupling is particularly adapted to tubing couplings and repairs; that is to connect tubing sections and/or to repair leaks at and intermediate the joints or unions therein. In FIG. 1 a typical tubing connection is shown wherein tube sections 10 and 11 are joined by a primary coupling union 12. The tube sections can vary as to diameter and the union can be a reducer to accommodate any such variations; however it is shown as a straight union 12 adapted to couple aligned tube sections 10 and 11 of the same outside diameter. In practice, such unions are customarily brazed onto the tube sections and it is this type of union which is illustrated, having a cylindrical outer diameter wall 13 and opposite end shoulders 14 and 15 at uniformly chamfered angles extending between the tubing diameter and said outer diameter wall. The union 12 is elongated, somewhat more than the diameter dimension thereof; and it is this tubing union over which the coupling hereinafter disclosed is to be installed, or in place of which it is installed. Accordingly, the coupling in its basic form involves, generally, a segmental body A, a segmental sleeve B, and a split seal C confined by the body A and/or sleeve B, the invention being characterized by the circumferential interlocked engagement of the outermost member hereinafter referred to as the body A.

The body A and sleeve B are formed of structural material having properties as circumstances require. In practice, the segments thereof are molded of metal or plastic material and they are machined as may be required. Both the body A and sleeve B are each comprised of at least two segments that are laterally engageable and separable over the tube sections 10 and 11, there being interlocking means D connecting the marginal edges of the body A, and when required there being interlocking means E connecting the marginal edges of the sleeve B. The body A and sleeve B are laterally assembled over the tubing sections 10 and 11 and are releasably interlocked by the means D and E respectively and all as hereinafter described.

The body A is segmental and comprised of at least two segments and is the encasing structure held secure by the interlocking means D. That is, the segments of the body A in all instances embraceably encompasses the sleeve B, seal C and tubing (10–11) to hermetically close the coupling at the shoulder 14. As shown, the body A is separated at longitudinally disposed lines of joinder lying in a plane coincidental with the central longitudinal axis $a$ of the coupling assembly; divisible segments 20 and 21 being separable at opposed coplanar faces 22 and 23 in said plane. The segments of the body are longitudinally sectional, being comprised of a tube alignment section X, a seal section Y and a sleeve section Z. The sections X, Y and Z are integrally formed and characterized by concentric cylinder bores stepped from the tubing diameter at X, to the seal diameter at section Y, and to the sleeve diameter at section Z. It is significant that the first mentioned step between sections X and Y establishes an inwardly faced shoulder 25 in a plane normal to axis $a$ and closing one end of the seal section Y when the section X is occupied by a tubing. The seal section Y is of an axial extent to overlie the end portion of the union 12, having an inner diameter wall 26 to slideably receive the outer diameter wall 13 of the union, whereby the shoulder 14 of the union opposes the shoulder 25 and closes the other end of the seal section Y. Thus, upon assembly of the body A over the tubing section and primary union 12, a closed annulus is established between spaced shoulders 14 and 25.

The sleeve B is segmental and comprised of at least two segments, and is the gland operating structure which forceably presses the seal C into full occupancy within the above described annulus. The sleeve B in all instances embraceably encompasses the tubing 11 and engages the opposite end shoulder 15 of the union (or equivalent structure) to react against the body A and draw the shoulders 14 and 25 together. In the preferred embodiment, the sleeve B embraceably encompasses a complementary seal C' that hermetically closes the coupling at the opposite shoulder 15 of the union 12, and in this instance it is the complementary seal C' that engages the shoulder 15 of the union, to be forced into hermetic sealed engagement therewith. As shown, the sleeve B is separated at longitudinally disposed lines of joinder lying in a plane coincidental with the central longitudinal axis $a$ of the coupling assembly; divisible segments 30 and 31 being separable at opposed coplanar faces 32 and 33 in said plane. The segments of the body are longitudinally sectional, being comprised of a tube alignment section X' and a seal section Y', said two sections being coextensively received in the above described sleeve section Z of the body A. The sections X' and Y' are integrally formed and characterized by concentric cylinder bores stepped from the tubing diameter at section X' to the seal diameter at section Y'. It is significant that the step between sections X' and Y' establish an inwardly faced shoulder 35 in a plane normal to axis $a$ and closing one end of the seal section Y' when the section X is occupied by a tubing. The seal section Y' is of an axial extent to overlie the end portion of the union 12, having an inner diameter wall 36 to slideably receive the outer diameter wall 13 of the union, whereby the shoulder 15 of the union opposes the shoulder 35 and closes the other end of the seal section Y'. Thus, upon assembly of the sleeve B over the tubing section and primary union 12, a closed annulus is established between spaced shoulders 15 and 35.

The seal c and/or C' is characteristically a split preformed ring that is bendable and thereby adapted to be warped onto the tubing sections 10 and/or 11. In the embodiment shown, the inner diameter walls 26 and 36 are of the same diameter to slideably engage over the union 12 of uniform diameter 13. Furthermore, the annuli between shoulders 14 and 25 and between 15 and 35 are to be of uniform axial extent, in which case the seals C and C' are of one and the same axial dimension. The seals C and C' are ring-shaped bodies of plastic material that will flow upon the forceable application of pressure thereto, and are fundamentally right cylindrical tubular members. The seal has therefore, inner and outer diameter walls 40 and 41 to freely engage with the inner diameter walls 26 and 36 and around the tubing sections 10 and 11 respectively. The seal has a normal outer end 42 to engage flat against the shoulder 25 or 35; and has a chamfered inner end 43 to engage flat against the shoulder 14 or 15. The cylindrical wall of the seal is completely severed by a diagonal or helical cut that extends coextensively between the ends 42 and 43, with mated circumferential abutment of the separable faces thereof. In practice, the seals C and C' are made of an elastomer or a synthetic material compatible with the environment of the installation, and in each instance capable of flowing into deformations complying with the chambered configurations and irregularities around and against the tubing and union respectively.

The interlocking means D provides for the releasable mating of the body segments 20 and 21, and secures one segment to the other with the opposed faces 22 and 23 thereof in coplanar engagement. The sectional body A is essentially a tubular shell comprised of laterally separable segments 20 and 21, and the interlocking means D therefore establishes circumferential continuity through the plane of joinder at the oppositely engaged faces 22 and 23. In the preferred embodiment the means D comprises a longitudinally removable key 50 that is insertable into a complementary recess 51. Although the key 50 can be a separate removable element, it is preferred to be an integral part of one segment 20 and embracing the other segment 21 to fit into the recess 51 therein. As shown, there is a key 50 and a complementary recess 51 at diametrically opposite margins of the segments, and formed with inclined dovetails. Consequently, coaxial aligned body sections 20 and 21 are axially movable into engagement and are hooked together and rendered laterally inseparable with the sections X, Y and Z thereof in radial alignment.

The interlocking means E provides for the releasable mating of the sleeve segments 30 and 31 and secures one segment to the other with the opposed faces 32 and 33 thereof in coplanar engagement. The sectional sleeve B is essentially a tubular shell comprised of laterally separable segments 30 and 31, and the interlocking means E therefor establishes circumferential continuity through the plane of joinder at the oppositely engageable faces 32 and 33. In the preferred embodiment the means E comprises a longitudinally movable key 60 that is insertable into a complementary recess 61. Although the key 60 can be a separate element, it is preferred to be an integral part of one segment 30 and embraces the other segment 31 to fit into the recess 61 therein. As shown, there is a key 60 and a complementary recess 61 at diametrically opposite margins of the segments, and formed with inclined dovetails. Consequently coaxial aligned sleeve segments 30 and 31 are axially movable into engagement and are hooked together and rendered laterally inseparable with the sections X' and Y' thereof in radial alignment.

In accordance with the invention, keying means F is provided to secure the segments of the body A and sleeve B in radial alignment and simultaneously to place the sleeve B into the body A so as to forceably deform the seals C and C' into hermetic conformity to the annuli (see FIG. 2). Although means F can take various forms it is advantageously accomplished in the threaded engagement of the sleeve B within the section Z of the body A. As shown, the sleeve B has external threads 65 and the section Z has internal threads 66, the thread helixes being aligned when the body A and sleeve B are radially aligned. In practice, manual radial alignment of the two assemblies is effected, followed by threaded engagement thereof which establishes the keyed longitudinal position and continued radial alignment thereof, and followed by continued threading of the sleeve B into the body A until the seals C and C' are compressed. That is, the seals are thereby forceably deformed to flow into all interstices and thereby fully occupy the annular chambers in which they are confined. The sealant material is selected for sufficiency of resilience, compressibility and memory; so as to remain in hermetic occupancy within the annular chambers within which they are fully contained.

From the foregoing description relating specifically to FIGS. 1-4, the fundamentals of the coupling will be apparent and in FIGS. 5 and 6 variations thereof are illustrated. FIG. 5 is a disclosure of a modification wherein the seals C and C' are combined as a single seal C'', in order to hermetically seal a lateral leak. Referring to FIG. 2, it is to be observed that the union 12 is presumably brazed to the tube sections 10 and 11. Assuming however that the union remains intact and leakage nevertheless occurs, then it is the brazed joint which is failing. Thus, the seals C and C' as shown in FIG. 2 hermetically engage the union ends 14 and 15 and encompass the tube sections immediate thereto in order to stop the issue of fluid. Therefore, the inventive concept includes a union 12 loosely fitted over the tube ends, as well as a union 12 that is brazed thereon. Referring again to FIG. 5, it is feasible to embrace a leak in a continuous length of tubing, a leak in the form of a fissure, as is indicated therein. In FIG. 6 of the drawings the laterally embraced tube fitting is an elbow L, in which case the sleeve B' is a complementary elbow shape and does not turn or revolve, but wherein the two separated bodies A' are threaded onto the angularly disposed sleeve ends. In this latter embodiment, the sleeve is not circumferentially interlocked and is held secure together by the threadedly surrounding bodies A', each body accommodating a seal C compressed by axial engagement with the opposite shoulders 14' and 15', as clearly illustrated in FIG. 6. Having described only a typical preferred form and application of my invention, I do not wish to be limited or restricted to the specific details herein set forth, but wish to reserve to myself any modifications or variations that may appear to those skilled in the art:

HAVING DESCRIBED MY INVENTION, I CLAIM:

1. A coupling for hermetically sealing over a fluid conducting tubular member and including, a segmental body encasing said member and laterally separable at a plane of joinder coincidental with the axis of said tubular member, said body segments having coaxially and radially aligned tube alignment, seal and sleeve sections defined by stepped bores and the bore of the tube alignment section adapted to embraceably encompass the tubular member and the bore of the seal section concentrically spaced radially from the bore of the tube alignment section with an inwardly faced shoulder extending therebetween in a plane normal to said axis, a segmental sleeve surrounding said tubular member and laterally separable at a plane of joinder coincidental with the axis of said member and with an inwardly faced shoulder in a plane normal to said axis and opposed to said first mentioned inwardly faced shoulder, a split-ring seal of bendable plastic material and of right cylinder form with an inner diameter wall adapted to be separated and warped onto the tubular member and with an outer diameter wall embraceably encompassed within the bore of said seal section and with opposite normal ends and one of which seats on said first mentioned inwardly faced shoulder, interlocking means connecting the body segments at said plane of joinder establishing circumferential continuity in said body, and sleeve placement means positioning the inwardly faced shoulder of the sleeve forceably against the other one end of the seal pressing the same into hermetic occupancy within the seal section of the body.

2. The hermetically sealing coupling as set forth in claim 1 and wherein the interlocking means comprises relatively movable longitudinally disposed key members circumferentially connecting the segments of the body.

3. The hermetically sealing coupling as set forth in claim 1, wherein the interlocking means comprises relatively movable longitudinally disposed key members circumferentially connecting the segments of the body, and wherein the sleeve placement means comprises a transversely disposed key engaged with the body segments establishing radial alignment thereof.

4. The hermetically sealing coupling as set forth in claim 1, wherein the interlocking means comprises longitudinally disposed dovetail engagement at said plane of joinder, and wherein the sleeve placement means comprises transversely keyed engagement of the body segments establishing radial alignment thereof.

5. The hermetically sealing coupling as set forth in claim 1, wherein the interlocking means comprises longitudinally disposed dovetail engagement of the body segments at said plane of joinder, and wherein the sleeve placement means comprises transversely keyed threaded engagement of the sleeve within the sleeve section of the body establishing radial alignment thereof.

6. A coupling for axially spaced hermetic sealing over a fluid conducting tubular member and including, a segmental body encasing said member and laterally separable at a plane of joinder coincidental with the axis of said tubular member, said body segments having coaxially and radially aligned tube alignment, seal and sleeve sections defined by stepped bores and the bore of the tube alignment section adapted to coextensively overlie and embraceably encompass the tubular member and the bore of the seal section concentrically spaced radially from the bore of the tube alignment section with an inwardly faced shoulder extending therebetween in a plane normal to said axis, a segmental sleeve surrounding said tubular member and laterally separable at a plane of joinder coincidental with the axis of said tubular member, said alignment and seal sections defined by stepped bores and the bore of the tube alignment section adapted to embraceably encompass the tubular member and the bore of the seal section concentrically spaced radially from the bore of the tube alignment section with an inwardly faced shoulder extending therebetween in a plane normal to said axis and opposed to said first mentioned inwardly faced shoulder, a pair of spaced split-ring seals of bendable plastic material and each of right cylinder form with an inner diameter wall adapted to be separated and warped onto the tubular member and with an outer diameter wall embraceably encompassed within the bore of said body seal section and sleeve section respectively and each with opposite normal ends and one of which seats on said inwardly spaced shoulder of the body and sleeve respectively, interlocking means connecting the body segments at said plane of joinder establishing circumferential continuity in said body, and sleeve placement means positioning the inwardly faced shoulder of the sleeve forceably against one of the said seals and pressing the same toward the other of said seals and both seals into hermetic occupancy within the seal sections of the body and the sleeve respectively.

7. The hermetically sealing coupling as set forth in claim 6 and wherein the interlocking means comprises relatively moveable longitudinally disposed key members circumferentially connecting the segments of the body.

8. The hermetically sealing coupling as set forth in claim 6, wherein the interlocking means comprises relatively movable longitudinally disposed key members circumferentially connecting the segments of the body, and wherein the sleeve placement means comprises a transversely disposed key engaged with the body segments establishing radial alignment thereof.

9. The hermetically sealing coupling as set forth in claim 6, wherein the interlocking means comprises longitudinally disposed dovetail engagement at said plane of joinder, and wherein the sleeve placement means comprises transversely keyed engagement of the body segments establishing radial alignment thereof.

10. The hermetically sealing coupling as set forth in claim 6, wherein the interlocking means comprises longitudinally disposed dovetail engagement of the body segments at said plane of joinder, and wherein the sleeve placement means comprises transversely keyed threaded engagement of the sleeve within the sleeve section of the body establishing radial alignment thereof.

11. The hermetically sealing coupling as set forth in claim 6 and wherein the fluid conducting tubular member is comprised of sections coupled by a union embraced between said pair of split-ring seals.

12. The hermetically sealing coupling as set forth in claim 6 and wherein the fluid conducting tubular member is comprised of sections coupled by a union entered into the seal section bores of the body and sleeve respectively.

13. The hermetically sealing coupling as set forth in claim 6 and wherein the fluid conducting tubular member is comprised of sections coupled by a union entered into the seal section bores of the body and sleeve respectively and having opposite end shoulders engaged with said spaced split-ring seals respectively.

14. A coupling for axially spaced hermetic sealing over a fluid conducting tubular member and including, a segmental body encasing said member and laterally separable at a plane of joinder coincidental with the axis of said tubular member, said body segments having coaxially and radially aligned tube alignment, seal and sleeve sections defined by stepped bores and the bore of the tube alignment section adapted to coextensively overlie and embraceably encompass the tubular member and the bore of the seal section concentrically spaced radially from the bore of the tube alignment section with an inwardly faced shoulder extending therebetween in a plane normal to said axis, a segmental sleeve surrounding said tubular member and laterally separable at a plane of joinder coincidental with the axis of said tubular member, said sleeve segments having coaxially and radially aligned tube alignment and seal sections defined by stepped bores and the bore of the tube alignment section adapted to embraceably encompass the tubular member and the bore of the seal section concentrically spaced radially from the bore of the tube alignment section with an inwardly faced shoulder extending therebetween in a plane normal to said axis and opposed to said first mentioned inwardly faced shoulder, a pair of spaced split-ring seals of bendable plastic material and each of right cylinder form with an inner diameter wall a adapted to be separated and warped onto the tubular member and with an outer diameter wall embraceably encompassed within the bore of said body seal section and sleeve seal section respectively and each with opposite normal ends and one of which seats on said inwardly spaced shoulder of the body and sleeve respectively, interlocking means connecting the body segments at said plane of joinder establishing circumferential continuity in said body, interlocking means connecting the sleeve segments at said plane of joinder establishing circumferential continuity in said sleeve, and sleeve placement means positioning the inwardly faced shoulder of the sleeve forceably against one of the said seals and pressing the same toward the other of said seals and both seals into hermetic occupancy within the seal sections of the body and the sleeve respectively.

15. The hermetically sealing coupling as set forth in claim 14 wherein at least one the interlocking means comprises relatively movable longitudinally disposed key members circumferentially connecting the segments thereof.

16. The hermetically sealing coupling as set forth in claim 14, wherein at least one of the interlocking means comprises relatively movable longitudinally disposed key member circumferentially connecting the segments thereof, and wherein the sleeve placement means comprises a transversely disposed key engaged with the body segments establishing radial alignment thereof.

17. The hermetically sealing coupling as set forth in claim 14, wherein at least one of the interlocking means comprises longitudinally disposed dovetail engagement at said plane of joinder, and wherein the sleeve placement means comprises transversely keyed engagement of the body segments establishing radial alignment thereof.

18. The hermetically sealing coupling as set forth in claim 14, wherein at least one of the interlocking means comprises longitudinally disposed dovetail engagement of the body segments at said plane of joinder, and wherein the sleeve placement means comprises transversely keyed threaded engagement of the sleeve within the sleeve section of the body establishing radial alignment thereof.

19. The hermetically sealing coupling as set forth in claim 14 and wherein the fluid conducting tubular member is comprised of sections coupled by a union embraced between said pair of split-ring seals.

20. The hermetically sealing coupling as set forth in claim 14 and wherein the fluid conducting tubular member is comprised of sections coupled by a union entered into the seal section bores of the body and sleeve respectively.

21. The hermetically sealing coupling as set forth in claim 14 and wherein the fluid conducting tubular member is comprised of sections coupled by a union entered into the seal section bores of the body and sleeve respectively and having opposite end shoulders engaged with said spaced split-ring seals pressed one toward the other.

* * * * *